(12) United States Patent
Xie

(10) Patent No.: US 7,715,481 B2
(45) Date of Patent: May 11, 2010

(54) SYSTEM AND METHOD FOR ALLOCATION OF RESOURCES FOR PROCESSING VIDEO

(75) Inventor: Ian Xie, Emeryville, CA (US)

(73) Assignee: Ipera Technology, Inc., San Mateo, CA (US)

( * ) Notice: Subject to any disclaimer, the term of this patent is extended or adjusted under 35 U.S.C. 154(b) by 16 days.

(21) Appl. No.: 11/766,685

(22) Filed: Jun. 21, 2007

(65) Prior Publication Data

US 2008/0122971 A1     May 29, 2008

Related U.S. Application Data

(60) Provisional application No. 60/867,626, filed on Nov. 29, 2006.

(51) Int. Cl.
*H04N 7/18*     (2006.01)

(52) U.S. Cl. ............................. 375/240.26; 375/240.25

(58) Field of Classification Search ................................. 375/240.01–240.29
See application file for complete search history.

(56) References Cited

U.S. PATENT DOCUMENTS 6,014,694 A     1/2000  Aharoni et al.
6,963,613 B2 *  11/2005 MacInnis et al. ....... 375/240.25
6,996,129 B2 *  2/2006  Krause et al. ................ 370/487
7,408,986 B2 *  8/2008  Winder ................... 375/240.12

OTHER PUBLICATIONS

International Search Report and Written Opinion of PCT Application No. PCT/US07/85648, date of mailing Sep. 24, 2008, 6 pages total.

* cited by examiner

*Primary Examiner*—Andy S Rao
(74) *Attorney, Agent, or Firm*—Townsend and Townsend and Crew LLP

(57)     ABSTRACT

System and method for efficient allocation of resources for processing video. According to an embodiment, the present invention provides a method for processing video. The method includes providing a system for processing video. The system is characterized by a known quantity of processing power. The method also includes providing a video file, which is characterized by a plurality of properties. The plurality of properties includes a file type, resolution, bit rate, frame rate, video quality, etc. The video type is associated with a first compression method. The method further includes determining the video type and the first compression method. Additionally, the method includes determining a first usage for the video file. For example, the first usage being associated with the video type. The method further includes decoding the video. Additionally, the method includes determining a residual processing power, which associated with the first usage. The method also includes providing a first plurality of processing modules.

31 Claims, 3 Drawing Sheets

SYSTEM AND METHOD FOR ALLOCATION OF RESOURCES FOR PROCESSING VIDEO

CROSS-REFERENCES TO RELATED APPLICATIONS

This application claims priority from U.S. Provisional Application No. 60/867,626 filed Nov. 29, 2006, which is incorporated by reference herein.

STATEMENT AS TO RIGHTS TO INVENTIONS MADE UNDER FEDERALLY SPONSORED RESEARCH OR DEVELOPMENT

Not applicable

REFERENCE TO A "SEQUENCE LISTING," A TABLE, OR A COMPUTER PROGRAM LISTING APPENDIX SUBMITTED ON A COMPACT DISK

Not applicable

BACKGROUND OF THE INVENTION

The present invention relates in general to video and image processing techniques. More particularly, the invention provides a method and system for efficiently enhancing videos and images. In an embodiment, the present invention provides a technique for selecting process techniques to be performed on videos based on various factors, such as available processing power, compression type, etc. For example, the embodiment dynamically constructs a system for processing videos. Merely by way of example, the invention is described as it applies to dynamically processing video for viewing, but it should be recognized that the invention has a broader range of applicability.

Over the last decade, with advent of consumer electronics and more specifically media players (e.g., DVD player, computer, portable multimedia devices, cellular phones, etc.) are used for playing media contents in various formats. For a variety of reasons, media contents often need to be decompressed and processed (e.g., enhanced, adjusted, etc.) before they are presented for viewing and/or other purposes.

Typically, video enhancements include a de-interlacing, removing compression artifacts, scaling, etc. For these, certain conventional techniques have been developed and improved. Some of the conventional techniques such as noise reduction, contrast enhancement, etc., are derived from traditional image processing techniques. As a result, these techniques are often inadequate, especially for real time applications. For example, various applications such as video enhancements are performed without regard to the specific characteristics for the video. As a result, these conventional techniques often leads to poor performance and unacceptable output.

Hence it is highly desirable to improve techniques for effectively and efficiently enhancing videos and images, especially for low-power handheld devices.

BRIEF SUMMARY OF THE INVENTION

The present invention relates in general to video and image processing techniques. More particularly, the invention provides a method and system for efficiently enhancing videos and images. In an embodiment, the present invention provides a technique for selecting processing to be performed on videos based on various factors, such as available processing power, compression type, etc. For example, the embodiment dynamically constructs a system for processing videos. Merely by way of example, the invention is described as it applies to dynamically processing video for viewing, but it should be recognized that the invention has a broader range of applicability.

According to an embodiment, the present invention provides a method for processing video. The method includes providing a system for processing video. The system is characterized by a known quantity of processing power (e.g., measured in MHz). The method also includes providing a video file, which is characterized by a plurality of properties. The plurality of properties includes a video format and a video size (bit rate). The video type is associated with a first compression method. The method further includes determining the video type and the first compression method. Additionally, the method includes determining a first usage for the video file. For example, the first usage being associated with the video type. The method further includes decoding the video file. Additionally, the method includes determining a residual processing power, which associated with the first usage. The method also includes providing a first plurality of processing modules. The method includes selecting a second plurality of processing modules based on the residual processing power. The second plurality of processing modules is a subset of the first plurality of processing modules. Moreover, the method includes processing the video file using the second plurality of processing modules. The method further includes providing an output.

According to yet another embodiment, the present invention provides a method for processing video. The method includes providing a system for processing video in a real time. For example, the real time being associating with a video playback speed. The system is characterized by a known quantity of processing power. The processing power is based on at least a predetermined available usage of a central processing unit. The method also includes providing a video, the video being characterized a plurality of properties that include a video type and a video bit rate. The video type is configured by a first compression type. The method further includes determining the video type and the first compression type. The method also includes determining a first usage of the predetermined available usage of the central processing unit for the video. The first usage is associated with the video type and the video bit rate. The method additionally includes processing the video to decode the video from the video type being in the first compression type to an uncompressed type. The method further includes determining a residual processing power from the first usage of the predetermined available usage of the central processing unit. The method also includes providing a first plurality of processing modules. Furthermore, the method includes selecting a second plurality of processing modules based on the residual processing power. The second plurality of processing modules is a subset of the first plurality of processing modules. Furthermore, the method includes processing the video using the second plurality of processing modules. Moreover, the method includes providing an output in accordance to the real time.

According to another embodiment, the present invention provides a method for processing a video. The method includes providing a system for processing video. The system is characterized by a known quantity of processing power. The method includes providing a video file, which is characterized a plurality of properties. The plurality of properties includes a video type and a video size. The video type is associated with a first compression method. The method further includes determining a first usage that is associated with decoding the video file. In addition, the method includes determining a second usage that is associated with scaling the video file. Also, the method includes selecting a plurality of processing modules based on the first usage and second usage. Moreover, the method includes processing the video file using the plurality of processing modules. The method additionally includes providing an output for a display.

According to yet another embodiment, the present invention provides a system for processing a video. The system includes a memory that is configured to store instructions. The system also includes a processor configured to execute the instructions. For example, the processor is characterized by a known quantity of processing power. The system additionally includes a user interface and a display. The instructions include a plurality of software modules. For example, the software modules include a decompression module, a control module, and a first plurality of processing modules. The control module is configured to determine a plurality of characteristics of a video file. The plurality of characteristics includes a file type, resolution, bit rate, frame rate, video quality, etc. The file type is associated with a compression method. The control module is further configured to determine a first usage. The first usage is associated with the decoding the video file. The control module is further configured to select a second plurality of processing modules that is a subset of the first plurality of processing module. The second plurality of processing modules is configured to process the video file. The display is configured to display the processed video file.

It is to be appreciated that embodiments according to the present invention offer various advantages over conventional techniques. For example, the embodiments of the present invention provide an efficient solution for enhancing videos and/or images. In a specific embodiment, the present invention provides a mechanism for an optimal use of processing resources by dynamically allocating resource of video processing based on a variety of factors, such as video bit rate, video type, video size, etc. Furthermore, embodiments of the present invention can be integrated into conventional systems with ease. For example, various embodiments of the present invention are implemented as software modular components in a general purpose computer. As another example, various embodiments are implemented with currently available hardware components, such as hardware decoders, memory components, etc. There are other benefits as well.

Various additional objects, features and advantages of the present invention can be more fully appreciated with reference to the detailed description and accompanying drawings that follow.

DETAILED DESCRIPTION OF THE INVENTION

Figure 1:
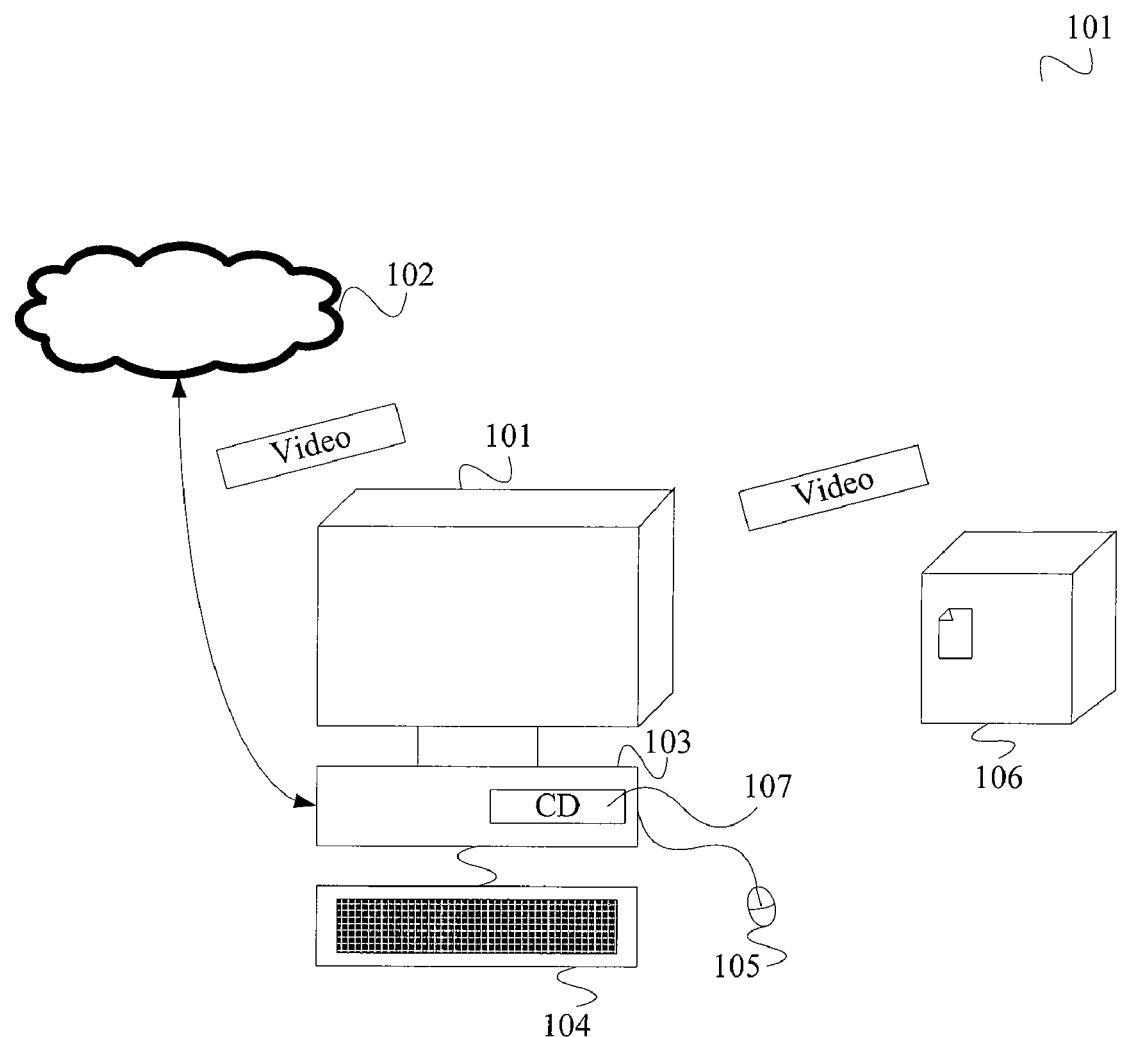
FIG. 1 is a simplified diagram illustrating a system according to an embodiment of the present invention.

The present invention relates in general to video and image processing techniques. More particularly, the invention provides a method and system for efficiently enhancing videos and images. In an embodiment, the present invention provides a technique for selecting processing to be performed on videos based on various factors, such as available processing power, compression type, etc. For example, the embodiment dynamically constructs a system for processing videos. Merely by way of example, the invention is described as it applies to dynamically processing video for viewing, but it should be recognized that the invention has a broader range of applicability.

As discussed above, conventional techniques for processing images and videos are often inadequate. More specifically, various convention video processing solutions are not flexible and efficient enough to process and/or enhance various type of videos in real-time applications. In certain scenarios, software video process solutions require more processing power than what is available. As a result, performance of conventional video solutions are often inadequate. For example, various video processing solution may work for certain systems but not others, as certain systems may be slower or use processing power for other applications. As described below, it is to be appreciated that embodiments of the present invention provide techniques that allow processing of video and/or graphics to be dynamically determined based on a various factors based on the video and/or graphics. For example, decoding H.264 video often consumes three times as much of resources as decoding MPEG 2 video of comparable quality.

In a stereotypical conventional system for processing video, a same set of processes is applied to video files, regardless of what are the types of these video files. For, video processing involves decompression, scaling, and enhancements. As an example, enhancements such as de-blocking, are typically desirable for many types of video files, including MPEG 2 and MPEG 4 files. However, it is often unnecessary to apply this enhancement to certain kind of video files. For example, de-blocking is an integral part in decoding an H.264 standard video file. Applying de-blocking on a decompressed H.264 video is wasteful on system resources and often adversely affect the video quality. It is to be appreciated that various embodiments of the present invention takes file type, bit rate, resolution and/or compression method into account when applying various processes and/or enhances on video files.

In addition, system or devices for processing video typically have limited processing power. A given system can only perform a limited number of operations within a given period of time. When the system is required to process video and/or images that at a rate beyond its power, the system often slows down and/or stop the process, which is unacceptable for video playback applications in real time. In a specific example, a system has sufficient amount of processing powers to decompress an MPEG 2 video and to perform various types of enhancements. However, since decoding an MPEG 4 video is computationally more costly than decoding an MPEG 2 video, a system that is able to decompress and enhance an MPEG 2 video may not have sufficient resource to do the same with an MPEG 4 video. As a result, the system may not be able to properly play the video (e.g., system lags, constants stoppages, etc.), and sometimes the system may not be able to play these files at all.

In contrast, various embodiments of the present invention dynamically determines what processes are to be applied to a video based on various characteristics of the system and the file. For example, characteristics for the video include video compression bit rate, format, type, etc. As another example, the characteristic of the system include connection speed, processor speed, available system resources, memory, storage, etc. Taking these factors into account, various embodiments of the present invention dynamically construct system for processing videos and/or images that is efficient and effective.

FIG. 1 is a simplified diagram illustrating a system according to an embodiment of the present invention. This diagram is merely an example, which should not unduly limit the scope of the claims. One of ordinary skill in the art would recognize many variations, alternatives, and modifications. As shown in FIG. 1, a system 100 includes a display 101, a processor 103, an optical drive 107, a keyboard 104, a mouse 105, an network 102, and a media source 106. The system 100 is specifically configured to processing videos according to an embodiment of the present invention. For example, the processor 103 is configured to execute various modules for processing video, such as a decompression module, a control module, and a video enhancing modules. For example, the control module is configured to determine a plurality of characteristics of a video file, such as bit rate, file type, file format, etc. As an example, the file type is associated with a compression method. The decompression module is use to decompress video file. For example, the decompression module includes a video decoder. The video enhancing modules are employed for enhancing videos in various ways, such as removing video artifacts, enhancing color and contrast, adjust luminance and chrominance, etc. As mentioned above, the video enhancing modules are dynamically selected and used based on a variety of factors.

According to various embodiments, the system 100 obtain videos through various sources. For example, the system 100 receives stream video from the network 102. For example, the network 102 is connected to the Internet and the system 100 receives the stream video through the internet. As another example, the system 100 retrieves a video file from its own storage system. In yet another example, the system 100 gets video files from the media source 106, which may be a cable box, an external storage unit, a DVD player, a game console, etc.

The keyboard 104 and the mouse 105 are used to provide user input for users. In various embodiments, the user input is implemented with other devices, such as touch screen, cell phone, thumb board, remote controller, etc.

According to an embodiment, the display 101 provides video display and/or user interface. For example, the display 101 may be an LCD display, a CRT display, a plasma display, etc. Depending on the application, the system 100 may include additional display components.

In certain embodiments, the system 100 as shown is implemented using a general purpose computer. In various applications, the system 100 may be implemented with a mobile device, a media player, a television, etc.

Figure 2:
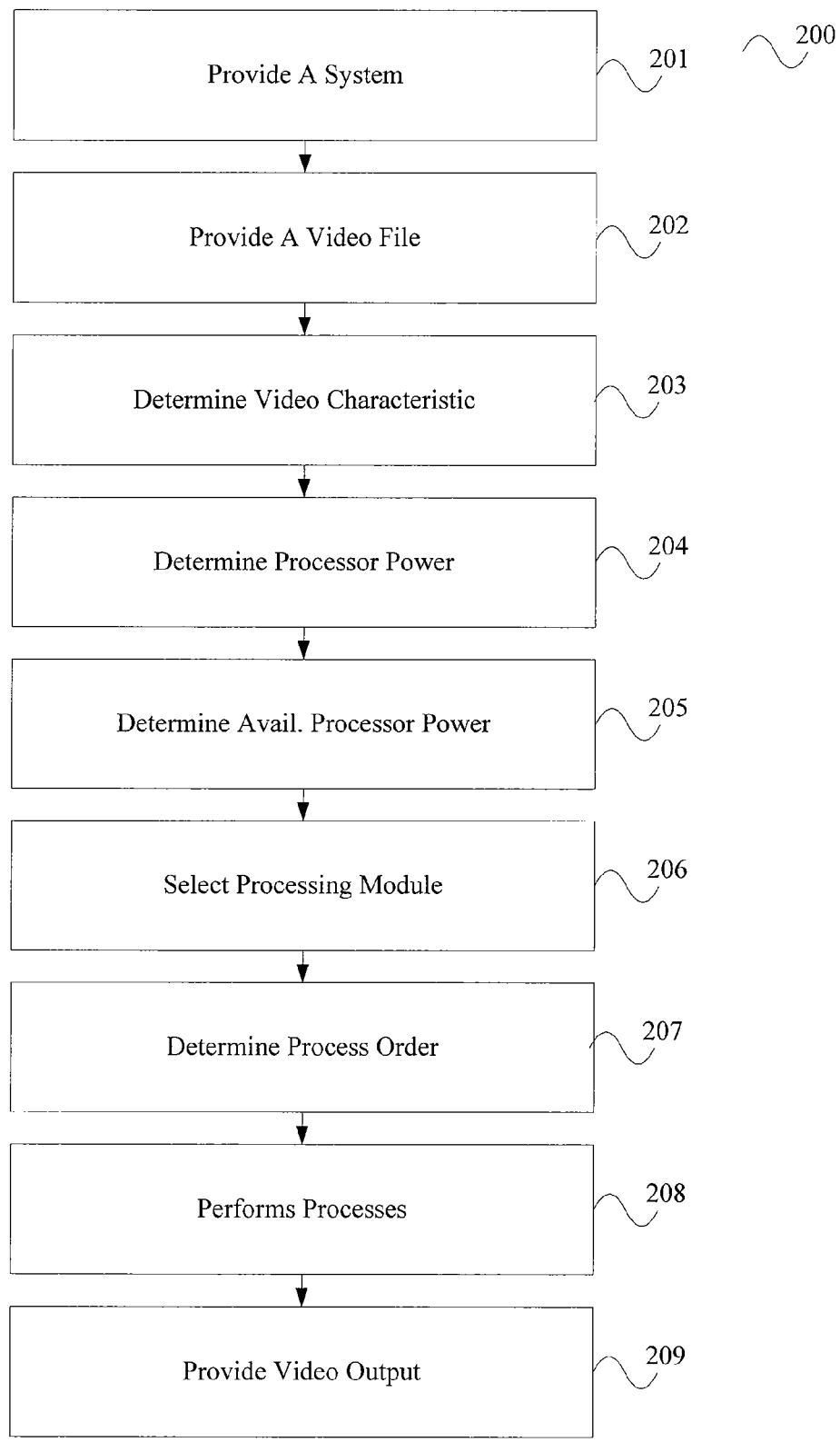
FIG. 2 is a simplified diagram illustrating a video process method according to an embodiment of the present invention.

FIG. 2 is a simplified diagram illustrating a video process method according to an embodiment of the present invention. This diagram is merely an example, which should not unduly limit the scope of the claims. One of ordinary skill in the art would recognize many variations, alternatives, and modifications. For example, various steps processed as illustrated may be added, removed, modified, replaced, rearranged, repeated, and/or overlapped. As explained above, the process flow may be implemented for a variety of devices, such as a personal computer, a media player, a cellular phone, a PDA, etc.

At step 201, a system for processing video is provided. Depending on the application, the system may be implemented for a variety of devices, such as a personal computer, a media player, a cellular phone, a PDA, etc. The processing power of the system limited by its available resources, such as processing speed, memory, power, etc. For example, the processing speed is a metric in which a computation unit is capable of performing calculations. Typically, the processing speed is important for performing video decompression and enhancements, as these processes are processor intensive. Memory and power consumption are also important metrics. For example, a processor typically consumes more power when operating at a high speed. In certain applications, such as for portable devices, it is often important to reduce energy consumption and to prolong the "on" time. In addition, the processing power of a system sometimes is limited by the operating temperature of the system. That is, performing high speed processes for long durations can lead to system overheating.

At step 202, a video file is obtained. The video file is characterized by a variety of properties, which include but not limited to bit rate, compression method for the video component, compression method for the audio component, the codec used, duration, native size, etc. Depending on the application, the video file is obtained in various ways. For example, the system receives stream video from a network, which may be a local area network, the Internet, Wi-Fi network, CDMA network, GSM network, etc. For example, the system receives the stream video through the Internet. As another example, the system retrieves a video file from its own storage system. In yet another example, the system gets video files from a media source, which may be a cable box, an external storage unit, a DVD player, a game console, etc.

At step 203, various properties for the video file are determined. Depending on the application and the need, these properties may be determined in various ways. According to a specific embodiment, the system examines a header for the video file and extract various information from the head file. In another embodiment, the system determines certain properties of the video file based on the file extension or source. In yet another embodiment, the system obtains detailed information of the file by thoroughly and/or partially parsing through the video file. For example, thorough parsing through the video file for statistical information allows more efficient and effective processing in certain applications. For example, the system determines that the brightness level for the entire video is too low (e.g., the entire video is underexposed), and the system provides a global brightness boost based on this information, as compared to determining and boosting brightness level in real time.

At step 204, the system determines a processing power usage for decoding the video. According to embodiments, various types of metrics are used for measuring the processing power usage. For example, the system determines the amount of processing power measured in clock speed (e.g., MHz) required for decoding the video file. In a specific embodiment, the determination of amount of processing power used is based on the properties of the video as described above. For example, decoding an MPEG 4 video at the VGA resolution consumes up to 500 Mhz or 20% of the processing power for a system.

At step 205, the system determines the amount of residual processing power and/or other resources that is available for performing various processes for the video. For example, the decoding of the video has a high priority than performing other processes for the video, as fast decoding speed is necessary for real time playback of videos. For example, the residual processing power is a function of the total processing power less the amount processing power usage for decoding the video. In certain embodiments, the system uses processing power for other applications has other applications, such as running the operating system, receiving telephone calls, etc., that takes higher priority than enhancing the video for playback. For these applications, the amount of residual processing power and/or resource equal what is still available after these resources have been allocated.

At step 206, the system selects what video processing modules to be used for processing and/or enhancing the video. According to various embodiments, the processing modules may include, but not limited to, de-ringing, de-mosquito, de-blocking, de-interlacing, luminance adjustment, chrominance adjust, LCD boost, etc. As an example, the processing modules are software modules, and processing of these software requires processing power. According to certain embodiments, the processing modules are hardware modules that consumes energy, and the processing of the modules uses energy of the system. In addition to processing power available, in certain embodiments the system selects video processing modules based on the video type. For example, for H.264 format video files, a de-blocking process is performed when videos are decoded, and therefore, the system does not perform de-blocking after the decoding process. According to a specific embodiment, the selection of video processing module is based on certain statistical characteristics of the video file (or video stream in a streaming scenario), such as overall brightness level, appearance of coding artifacts, noise level, color, etc.

In various embodiments, the system is configured to dynamically select what processing modules are used in real time. In a specific embodiment, the system temporarily stops a low priority processing for enhancing the video upon a detection of a reduction in available system processing power (e.g., due to incoming calls, background software processes, etc.). On the other hand, the system initiates more processes for enhancing video upon a detection of an increase in the available processing power.

In a specific embodiment, the system also determines the order in which processing is to be performed. For example, if the video is to be scaled up, various processes (e.g., enhancement, adjustment, etc.) are performed before the scaling. On the other hand, if the video is to be scaled down, various processes (e.g., enhancement, adjustment, etc.) are performed after the scaling. As a result, processing is selectively performed on the smaller video, thereby reducing the amount of computational resources needed.

According to certain embodiments, the system selects the what video processing modules to be used based on a lookup table. For example, based on the processing power available, the system checks a look up table to determine what component to be selected. For example, the lookup table is shown below:

TABLE 1

| avail. resource | decoding | scaling | noise reduction | de-interlacing | luminance | chrominance |
|---|---|---|---|---|---|---|
| 100 MHz | x | x | | x | | |
| 200 MHz | x | x | x | x | | |
| 300 MHz | x | x | x | x | x | |
| 400 MHz | x | x | x | x | x | x |

At step 207, the system determines the order in which processes are performed. For example, de-blocking is typically performed before de-interlacing, for better result and higher efficiency. In certain embodiments, certain processes for enhancing the video are performed in parallel.

At step 208, the selected processes are performed to enhance the video quality.

At step 209, the processed video is provided as an output. According to an embodiment, the processed video is display on an LCD screen for viewing. For example, the processed output video is uncompressed. According to another embodiment, the processed video is provided to an storage source. In a specific embodiment, the output is a video stream for transmission over a communication network.

Figure 3:
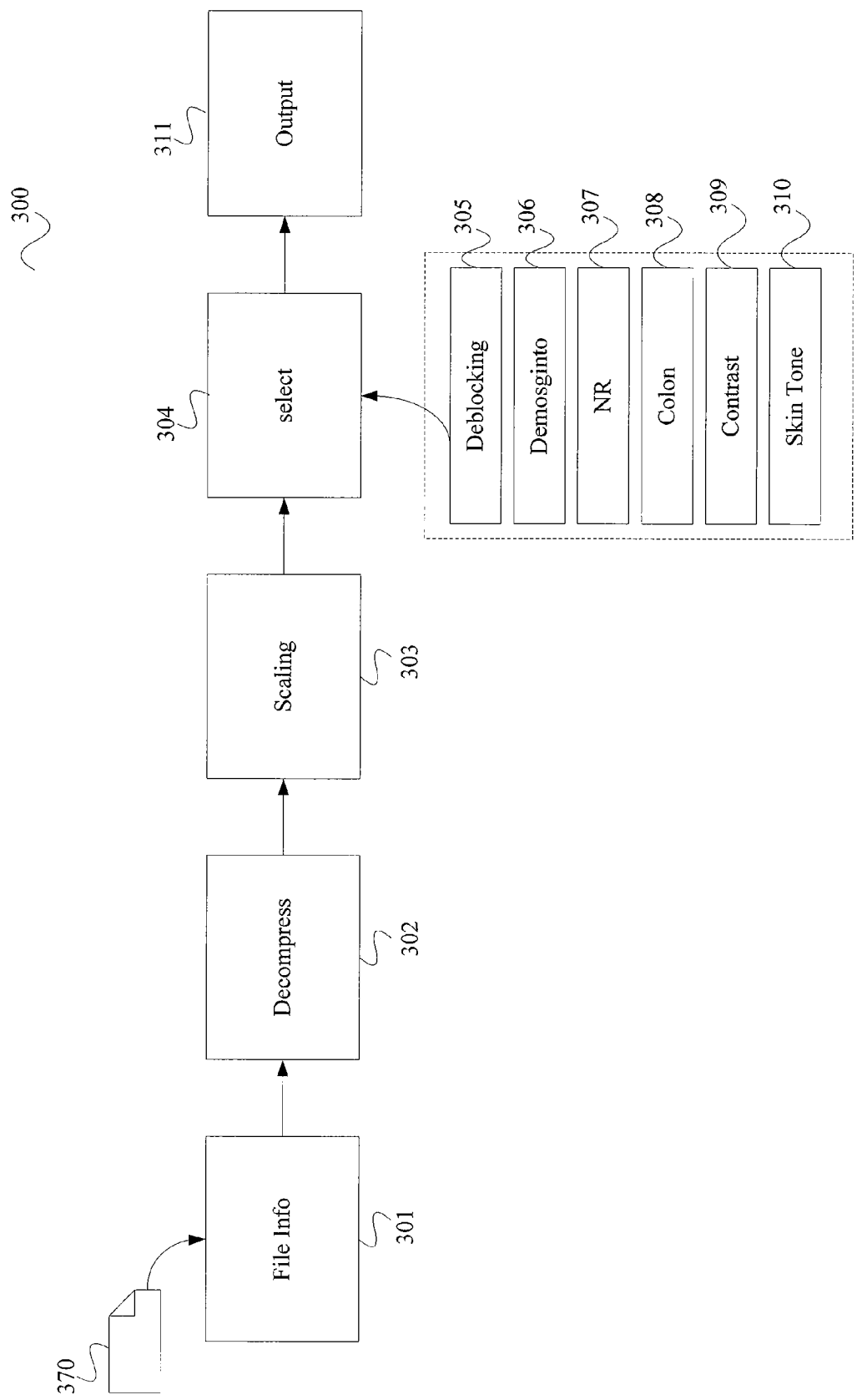
FIG. 3 is a simplified diagram illustrating a video process flow according to an embodiment of the present invention.

FIG. 3 is a simplified diagram illustrating a video process flow according to an embodiment of the present invention. This diagram is merely an example, which should not unduly limit the scope of the claims. One of ordinary skill in the art would recognize many variations, alternatives, and modifications. For example, various steps processed as illustrated may be added, removed, modified, replaced, rearranged, repeated, and/or overlapped.

A system 300 includes modules 301-311. A video file 320 is provided to the system 300 for processing. The system 300 first determines various characteristics associated with the video file. For example, these characteristics include video format, bit rate, file type, codec associated with the video file, file length, playtime, native display size, etc.

Next the module 302 performs decoding and/or decompression. As explained above, the module 302 is associated with a high priority, which allows this module to function before other modules.

The scaling module 303 is provided to ensure that the file output from the system based on the video module is correct. For example, the scaling module 303 scales up the size of the video to fill a screen with or without maintaining the aspect ratio. Depending on the application, the scaling process may be altered during the playback of a video file. For example, when a video display size is change, the scaling process is changed accordingly. As an example, when the display size is changed from a large size to the size of the video, the scaling process is not performed.

The selector module 304 determines what video processes are performed. As explained above, the system is configured to dynamically select what processing modules are used in real time. In a specific embodiment, the system temporarily stops a low priority processing for enhancing the video upon a detection of a reduction in available system processing power (e.g., due to incoming calls, background software processes, etc.). On the other hand, the system initiates more processes for enhancing video upon a detection of an increase in the available processing power. As shown, based on various factors, the selector module 304 determines which of the modules 305-310 should be used.

The output module 311 is used to provide the video output. For example, the output module 311 performs various functions to ensure the video output is compatible to the output device, such as LCD display, storage device, etc.

According to an embodiment, the present invention provides a method for processing video. The method includes providing a system for processing video. The system is characterized by a known quantity of processing power. The method also includes providing a video file, which is characterized by a plurality of properties. The plurality of properties includes a video type, video bit rate, and a video size. The video type is associated with a first compression method. The method further includes determining the video type and the first compression method. Additionally, the method includes determining a first usage for the video file. For example, the first usage being associated with the video type. The method further includes decoding the video file. Additionally, the method includes determining a residual processing power, which associated with the first usage. The method also includes providing a first plurality of processing modules. The method includes selecting a second plurality of processing modules based on the residual processing power. The second plurality of processing modules is a subset of the first plurality of processing modules. Moreover, the method includes processing the video file using the second plurality of processing modules. The method further includes providing an output. For example, the embodiment is illustrated according to FIG. 2.

According to another embodiment, the present invention provides a method for processing a video. The method includes providing a system for processing video. The system is characterized by a known quantity of processing power. The method includes providing a video file, which is characterized a plurality of properties. The plurality of properties includes a video type, video bit rate, and a video size. The video type is associated with a first compression method. The method further includes determining a first usage that is associated with decoding the video file. In addition, the method includes determining a second usage that is associated with scaling the video file. Also, the method includes selecting a plurality of processing modules based on the first usage and second usage. Moreover, the method includes processing the video file using the plurality of processing modules. The method additionally includes providing an output for a display. For example, the embodiment is illustrated according to FIG. 2.

According to yet another embodiment, the present invention provides a system for processing a video. The system includes a memory that is configured to store instructions. The system also includes a processor configured to execute the instructions. For example, the processor is characterized by a known quantity of processing power. The system additionally includes a user interface and a display. The instructions include a plurality of software modules. For example, the software modules include a decompression module, a control module, and a first plurality of processing modules. The control module is configured to determine a plurality of characteristics of a video file. For example, the plurality of characteristics includes a file type, resolution, bit rate, frame rate, video quality, etc. The file type is associated with a compression method. The control module is further configured to determine a first usage. The first usage is associated with the decoding the video file. The control module is further configured to select a second plurality of processing modules that is a subset of the first plurality of processing module. The second plurality of processing modules is configured to process the video file. The display is configured to display the processed video file. For example, the embodiment is illustrated according to FIG. 1.

It is to be appreciated that embodiments according to the present invention offer various advantages over conventional techniques. For example, the embodiments of the present invention provide an efficient solution for enhancing videos and/or images. More specifically, embodiments of the present invention are suitable for real time video processing and/or playback. In a specific embodiment, the present invention provides a mechanism for an optimal use of processing resources by dynamically allocating resource of video processing based on a variety of factors, such as video type, video size, etc. Furthermore, embodiments of the present invention can be integrated into conventional systems with ease. For example, various embodiments of the present invention are implemented as software modular components in a general purpose computer. As another example, various embodiments are implemented with currently available hardware components, such as hardware decoders, memory components, etc. There are other benefits as well.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for processing video, the method comprising:
providing a system for processing video in a real time, real time being associating with a video playback speed, the system being characterized by a known quantity of processing power, the processing power being based on at least a predetermined available usage of a central processing unit;
providing a video, the video being characterized a plurality of properties, the plurality of properties including a video type and a video bit rate, the video type being configured by a first compression type;
determining the video type and the first compression type;
determining a first usage of the predetermined available usage of the central processing unit for the video, the first usage being associated with the video type and the video bit rate;
processing the video to decode the video from the video type being in the first compression type to an uncompressed type;
determining a residual processing power from the first usage of the predetermined available usage of the central processing unit;
providing a first plurality of processing modules;
selecting a second plurality of processing modules based on the residual processing power, the second plurality of processing modules being a subset of the first plurality of processing modules;
processing the video using the second plurality of processing modules; and
providing an output in accordance to the real time.

2. The method of claim 1 wherein the processing power is further based on an available system resources.

3. The method of claim 1 wherein the video comprises a video stream.

4. The method of claim 1 wherein the video comprises a video file.

5. The method of claim 1 further comprising:
receiving the video from a network location;
buffering the video.

6. The method of claim 1 wherein the residual processing power is a function of at least an available system memory.

7. The method of claim 1 further determining a video playback bit rate based on the available system power.

8. A method for processing video, the method comprising:
providing a system for processing video in a real time, the system being characterized by a known quantity of processing power;
providing a video, the video being characterized a plurality of properties, the plurality of properties including a video type and a video bit rate, the video type being associated with a first compression method;
determining the video type and the first compression method;
determining a first usage for the video, the first usage being associated with the video type and the video bit rate;
decoding the video based on the first compression method;
determining a residual processing power, the residual processing power being associated with the first usage and a real playback;
providing a first plurality of processing modules, the first plurality of processing modules including a first video enhancement module, the first video enhancement module being operable using a portion of the known quantity of the processing power;

selecting a second plurality of processing modules based on the residual processing power, the second plurality of processing modules being a subset of the first plurality of processing modules, the second plurality of processing modules including the first video enhancement module only if the residual processing power is above a predetermined threshold level;

processing the video using the second plurality of processing modules; and providing an output in accordance to the real time.

9. The method of claim 8 wherein the video comprises a video stream.

10. The method of claim 8 wherein the video comprises a video file.

11. The method of claim 8 wherein the selecting a second plurality of processing modules is further based on a power usage.

12. The method of claim 8 wherein the selecting a second plurality of processing modules is further based on a real time performance metric.

13. The method of claim 8 wherein the selecting a second plurality of processing modules is further based on the video type.

14. The method of claim 8 further comprising:
determining a change in the first usage;
selecting a third plurality of processing module based on the change.

15. The method of claim 8 further comprising determining an order for processing the video.

16. The method of claim 8 further comprising determining a level of processing for a first processing module, the level of processing being associated with the first usage.

17. A method for processing a video, the method comprising:
providing a system for processing video, the system being characterized by a known quantity of processing power;
providing a video, the video being characterized a plurality of properties, the plurality of properties including a video type and a video bit rate, the video type being associated with a first compression method;
determining a first usage, the first usage being associated with decoding the video;
determining a second usage, the second usage being associated with scaling the video;
selecting a plurality of processing modules based on the first usage and second usage;
processing the video using the plurality of processing modules; and
providing an output for a display.

18. The method of claim 17 wherein the video comprises a video stream.

19. A system for processing a video, the system comprising:
a memory, the memory being configured to store instructions;
a processor configured to execute the instructions, the processor being characterized by a known quantity of processing power;
a user interface;
a display;
wherein:

the instructions includes a plurality of software modules, the software modules including a decompression module, a control module, and a first plurality of processing modules;

the control module is configured to determine a plurality of characteristics of a video, the plurality of characteristics including a file type and a bit rate, the file type being associated with a compression method;

the control module is further configured to determine a first usage, the first usage being associated with the decoding the video;

the control module is further configured to select a second plurality of processing modules, the second plurality of processing modules being a subset of the first plurality of processing module;

the second plurality of processing modules is configured to process the video;

the display is configured to display the processed video.

20. The system of claim 19 wherein the video comprises a video stream.

21. The system of claim 19 wherein the processing power is measured by a percentage.

22. The system of claim 19 wherein the processor comprises an embedded processor.

23. The system of claim 19 wherein the processor comprises an ARM CPU.

24. The system of claim 19 wherein the processor comprises a digital signal processing unit.

25. The system of claim 19 further comprising a communication interface for receiving the video over a network.

26. A method for processing video, the method comprising:
providing a system for processing video in real time, the system being characterized by a predetermined quantity of processing power;
providing a video, the video being characterized a plurality of properties, the plurality of properties including a first frame rate, a video type, and a video bit rate, the video type being associated with a first compression method, the first frame rate being greater than 10 frames per second (FPS);
determining the video type and the first compression method;
determining a first usage for the video, the first usage being associated with at least the video bit rate;
decoding the video;
determining a residual processing power, the residual processing power being associated with the first usage;
providing a first plurality of processing modules;
selecting a second plurality of processing modules based on the residual processing power, the second plurality of processing modules being a subset of the first plurality of processing modules;
processing the video using the second plurality of processing modules; and
providing an output at a second frame rate, the second frame rate being at least 10 FPS.

27. The method of claim 26 wherein the video comprises a video stream.

28. The method of claim 26 further comprising:
determining an order for processing the video using the second plurality of processing modules.

29. The method of claim 26 further comprising:
detecting a change in the residual processing power;
selecting a third plurality of processing modules based on the change.

30. A method for processing video, the method comprising:
- providing a system for processing video in a real time, the system being characterized by a predetermined quantity of processing power;
- providing a video, the video being characterized a plurality of properties, the plurality of properties including a first frame rate, a video type, and a video bit rate, the video type being associated with a first compression method, the first frame rate being greater than 10 frames per second (FPS);
- determining the video type and the first compression method;
- determining a first usage for the video, the first usage being associated with at least the video bit rate;
- decoding the video;
- processing the decoded video using at least a first processing module, the first processing module being associated with a second usage;
- determining a first residual processing power, the first residual processing power being associated with the first usage and the second usage;
- selecting at least a second processing module based on the first residual processing power, the second processing module being associated with a third usage; and
- processing the video using the second processing module.

31. The method of claim 30 further comprising:
- determining a second residual processing power, the second residual processing power being associated with at least the first usage, the second usage, and the third usage;
- selecting at least a third processing module based on the second residual processing power.

* * * * *